United States Patent [19]

Gaiser et al.

[11] 4,335,456
[45] Jun. 15, 1982

[54] SWITCH-THROUGH UNIT FOR BIT GROUPS WITHIN A PROGRAM CONTROLLED, ELECTRONIC DATA SWITCHING SYSTEM

[75] Inventors: Rainer Gaiser, Munich; Rolf Hagen, Unterhaching; Bernhard Schaffer, Lochham, all of Fed. Rep. of Germany

[73] Assignee: Siemens Aktiengesellschaft, Munich, Fed. Rep. of Germany

[21] Appl. No.: 116,235

[22] Filed: Jan. 28, 1980

Related U.S. Application Data

[63] Continuation of Ser. No. 887,964, Mar. 20, 1978, abandoned, which is a continuation of Ser. No. 660,939, Feb. 24, 1976, abandoned.

[30] Foreign Application Priority Data

Feb. 26, 1975 [DE] Fed. Rep. of Germany ........ 2508323

[51] Int. Cl.³ .............................................. H04J 3/00
[52] U.S. Cl. ........................................ 370/58; 370/60
[58] Field of Search ..................... 370/58, 59, 60, 63, 370/80, 42, 84, 110, 94

[56] References Cited

U.S. PATENT DOCUMENTS

| | | | |
|---|---|---|---|
| 3,711,835 | 1/1973 | Jaeger et al. ......................... | 364/200 |
| 3,717,723 | 2/1973 | Jaskulke et al. ...................... | 370/58 |
| 3,840,707 | 10/1974 | Hemdal ................................. | 370/59 |
| 3,862,373 | 1/1975 | Cohen et al. .......................... | 370/42 |
| 3,894,189 | 7/1975 | Edstrom et al. ....................... | 370/60 |
| 3,927,268 | 12/1975 | Sciulli et al. ........................... | 370/80 |

FOREIGN PATENT DOCUMENTS 1164954 9/1969 United Kingdom .

OTHER PUBLICATIONS

"Der Fernmelde Ingenieur", 26th Edition (1972).
"Siemens System EDS–System Description", Siemens AG (1973).

*Primary Examiner*—Thomas A. Robinson
*Attorney, Agent, or Firm*—Schuyler, Banner, Birch, McKie & Beckett

[57] ABSTRACT

A method for carrying out the program controlled switching of transmitted data is described. The data are formed into bit groups, and the groups are interleaved within a time division multiplex (t.d.m.) signal frame; the position of the bit group in the frame corresponds to its channel assignment. When bit groups to be switched are received, individually with respect to each line, a request is made to the switching system. Additionally, a feeder channel address is formed from the position of the bit group within the t.d.m. frame, and in at least one coding device assigned to the lines, the feeder line address of the bit group is formed. On the basis of the feeder address (i.e., channel and line address) a feeder cell permanently assigned to each feeder line in a connection store is selected. The bit groups received during the connection establishment stage contain signaling characteristics by means of which the desired trunk address is entered into the feeder cell. When a connection has been completed following the reception of each bit group, the trunk address stored in the feeder cell is read out. The bit groups are in each case fed by means of a decoder circuit to the trunk line characterized by the trunk line address. Prior to transmission, they are entered into a switch-through store which comprises a t.d.m. frame at the point characterized by the trunk channel address.

2 Claims, 5 Drawing Figures

E80 = 600 Bit/s

E1 + E21 + E41 + E61 = 2,4 K Bit/s

SWITCH-THROUGH UNIT FOR BIT GROUPS WITHIN A PROGRAM CONTROLLED, ELECTRONIC DATA SWITCHING SYSTEM

This is a continuation of Application Ser. No. 887,964, filed on Mar. 20, 1978, now abandoned, which is a continuation of Application Ser. No. 660,939, filed on Feb. 24, 1976, now abandoned.

BACKGROUND OF THE INVENTION

The invention relates to a method for the program controlled switching of data which are transmitted in pulsed data networks in an interleaved arrangement and in bit groups within a time division multiplex (t.d.m.) frame, where the position of a bit group in the t.d.m. frame corresponds to a channel assignment.

In a known electronic data switching system (see, e.g., "Der Fernmeldeingenieur", 26th Ed. Vol. 5 and 6), the data signals received on the feeder lines are in each case switched to the desired trunk lines by only switching through the polarity changes occurring in the data signals. This is subject to the condition that in each case only single-channel data transmission takes place via the feeder and trunk lines which are directly connected to the switching system. In the event that a data line serving to transmit data for a plurality of channels in accordance with t.d.m. techniques, is connected to the data switching system, it is necessary to carry out a spatial separation of the channels with respect to each line before such a line is connected to the switching system. This requires a substantial expense, however, and in addition in such a situation the switching system is subject to the same load which would exist if as many data lines were connected as the sum of the channels transmitted on the data lines.

An object of the invention is to provide a method which enables a direct connection of t.d.m. multi-channel data transmission lines to an electronic data switching system, and also facilitates an efficient switch-through of these lines.

SUMMARY OF THE INVENTION

The foregoing and other objects are achieved in accordance with the invention in that upon the reception of bit groups which are to be switched through, individually with respect to each line, a request is made to the switching system, and in addition to the said request, the feeder channel address is also formed from the position of the bit group within the t.d.m. frame. In at least one coding device assigned to the lines, the feeder line address of the bit group is formed. On the basis of the feeder address (channel and line address), a feeder cell in a connection store permanently assigned to each feeder is selected by a switch-through flow control unit. The bit groups received during the the connection establishment stage of operation contain signalling characteristics by means of which the desired trunk address (channel and line address) is entered into the feeder cell. When a connection has been switched through following the reception of each bit group, by the switch-through flow control unit, the trunk address stored in the feeder cell is read out. The bit groups are in each case fed via a decoder circuit to the trunk line indicated by the trunk line address, where, prior to transmission, they are entered in a switch-through store which comprises a t.d.m. frame, at the point indicated by the trunk channel address.

An advantageous form of practicing the invention comprises comparing the bit groups with samples at the receiving end, and as a result of the comparison, a signal is formed on the basis of which it is decided whether a received bit group is to be processed by the switching system or not.

Finally, an advantageous further development of the invention is characterized in that in the event of the repeated repetition of identical bit groups on a channel, a signal is formed. On the basis of this signal in each case only commencing from the first of a sequence of identical bit groups, a switching request is directed to the switching system. Following the switch-through of the first bit group at the transmitting end, the same bit group is repeatedly read out from the switch-through store and transmitted on the trunk line.

Thus, by means of the invention it is possible to connect a data transmission line comprising a plurality of t.d.m. channels, without previous spatial spreading of the channels, directly to the electronic data switching system. Furthermore, as a result of the use of bit group switching and the use of the switching system only for vitally necessary switching processes, the switching system is subject to a minimal load.

BRIEF DESCRIPTION OF THE DRAWINGS

Details of a preferred form of the invention will be explained in the following making reference to an exemplary embodiment illustrated in the drawing, in which.

DETAILED DESCRIPTION OF THE DRAWINGS

Figure 1:
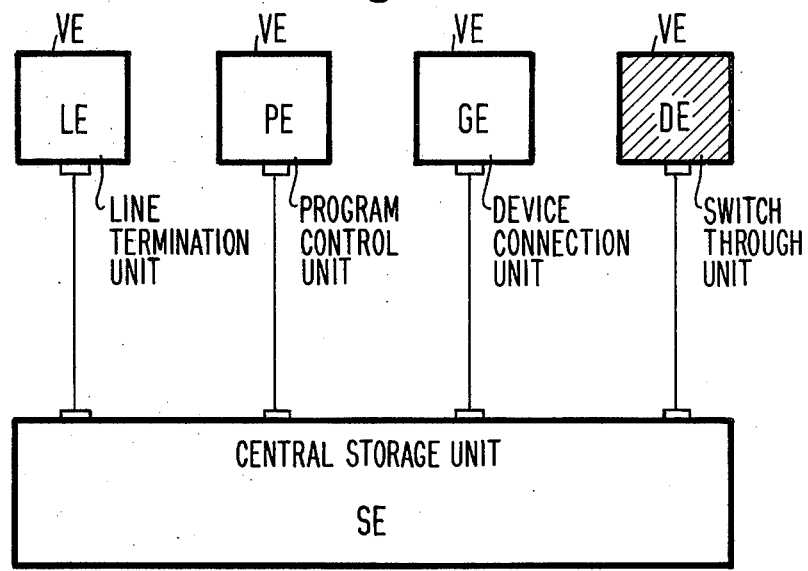
FIG. 1 is a block circuit diagram of a known electronic data switching system, having a switch-through unit, which, in accordance with the invention, has been integrated into the system.

FIG. 1 shows a known electronic data switching system in a block circuit diagram. This electronic data switching system comprises a plurality of processing units VE and a central storage unit SE to which the processing units are connected in the manner of satellites. That is, the processing units independently communicate with the storage, and they can communicate with each other only through the storage. Here, the processing units VE are in the form of a line termination unit LE, a program control PE and a device connection unit GE. In accordance with the invention, a switch-through unit DE is additionally provided. Apart from the switch-through unit DE, the other processing units and the storage unit have already been described in detail in the referenced publication.

The switch-through of bit groups transmitted on t.d.m. multi-channel data transmission lines is effected not only with the line termination unit LE which normally switches only polarity changes, but also with the aid of the switch-through unit DE. In explanation of the function of the switch-through unit DE, making reference to FIG. 2, the multi-channel t.d.m. transmission of bit groups, as proposed by the CCITT in a recommendation draft, will briefly explained.

Figure 2:
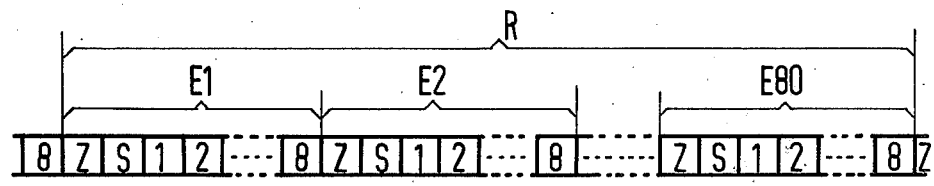
FIG. 2 is a time diagram illustrating a t.d.m. frame.

FIG. 2 shows a t.d.m. frame R which in the present case consists of 80 bit groups E1 to E80; the bit groups are referred to as envelopes. Each envelope contains 8 data bits, one sychronizing bit S and a status bit Z. The status bit Z serves to characterize a bit group as signalling characteristic in the case of connection establishment or as communications characteristic when a connection has been switched through. Envelope-synchronization is carried out with the aid of the synchronizing bit S.

Each envelope can be assigned a channel within the t.d.m. frame R. In this way the data of 80 channels can be transmitted across one single data line. In such a case the transmission speed is uniform for all the channels.

Figure 3:
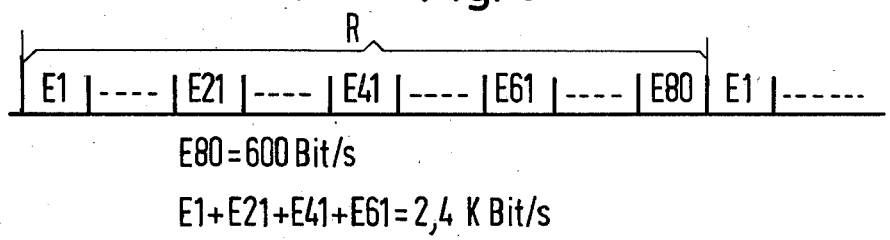
FIG. 3 is a time diagram illustrating a t.d.m. frame with channels having differing transmission speeds.

If a data line possesses channels having differing transmission speeds, then within a t.d.m. frame, a plurality of time slots are assigned to one data channel. An example of this kind is shown in FIG. 3. Similarly, as in FIG. 2, the t.d.m. frame R shown in FIG. 3 also consists of 80 envelopes, each of which is not, however, assigned to an individual data channel, as is the case in FIG. 2, but where the envelopes E1, E21, E41 and E61 belong to a data channel having 4 times the transmission speed of a data channel which is in each case assigned only one envelope, for example E80 in a t.d.m. frame R. Thus, if the data channel E80 exhibits the transmission speed of 600 bits/sec. then 2.4K bits/sec are transmitted over the faster channel. It will be obvious that in addition to the channel having the transmission speed of 2.4 bits/sec. other channels having lower or higher transmission speeds can also be provided in which case the transmission speeds will, respectively, amount to a whole multiple of the lowest transmission speed of 600 bits/sec.

If, as illustrated in FIGS. 2 and 3, the data transmitted on a plurality of channels on a line are to be switched through from a feeder line to a trunk line in a data switching system, a problem exists, not only in the spatial assignment of the feeder and trunk lines, but also of classifying the data in the correct channels on the trunk line within a t.d.m. frame. To achieve this it is possible to spatially spread out the individual channels at the receiving end and then to connect the individual channels as special lines to a data switching system. However, this necessitates a great expense. In accordance with the invention, a different procedure is adopted which does not require this previous spatial spreading out of channels and which facilitates the direct connection of multi-channel t.d.m. data lines to an electronic data switching system.

Figure 4:
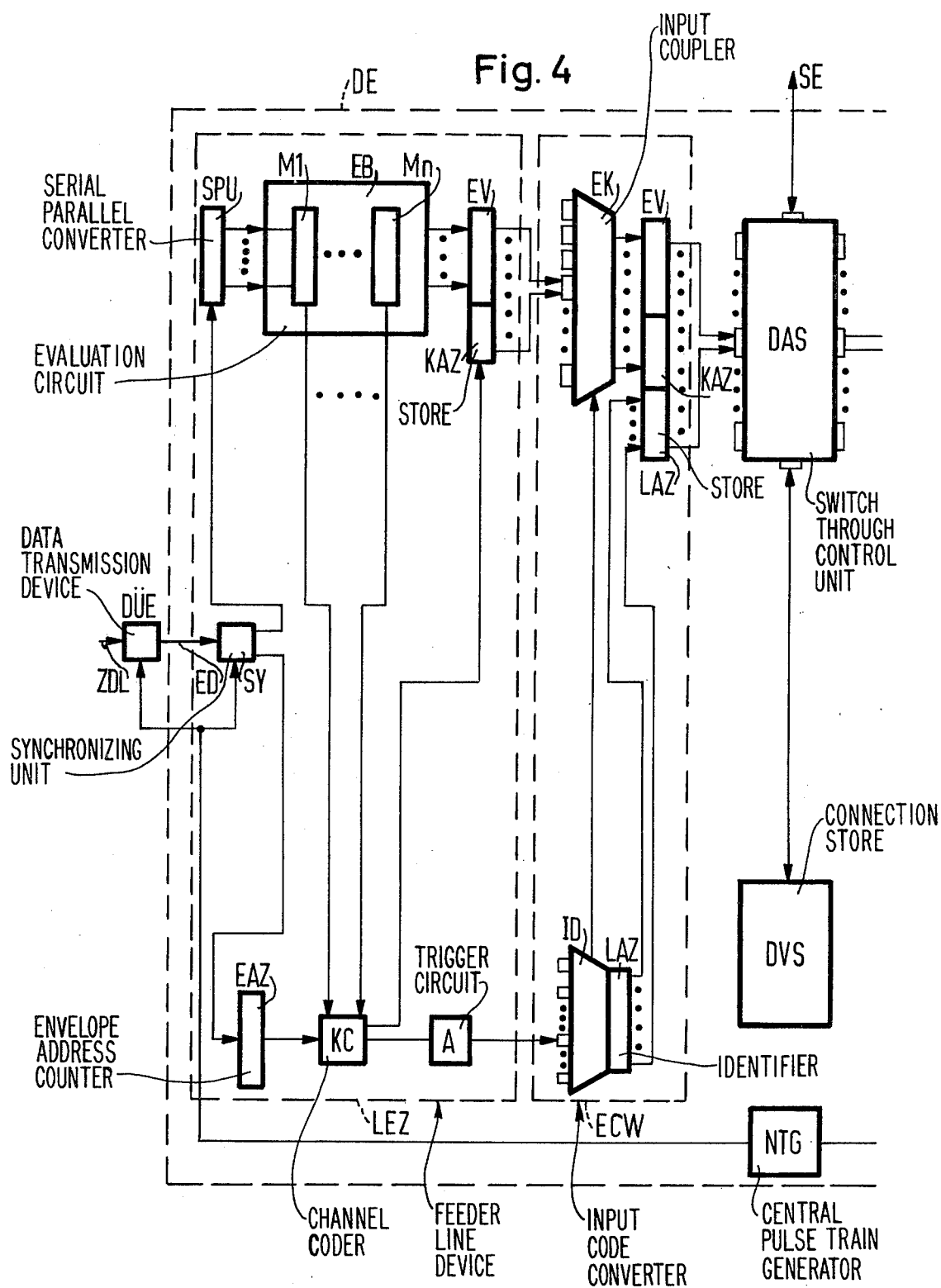
FIGS. 4 and 5 are schematic diagrams which, when placed side-by-side, schematically illustrate the construction of a switch-through unit in which the method in accordance with the invention is employed.
Figure 5:
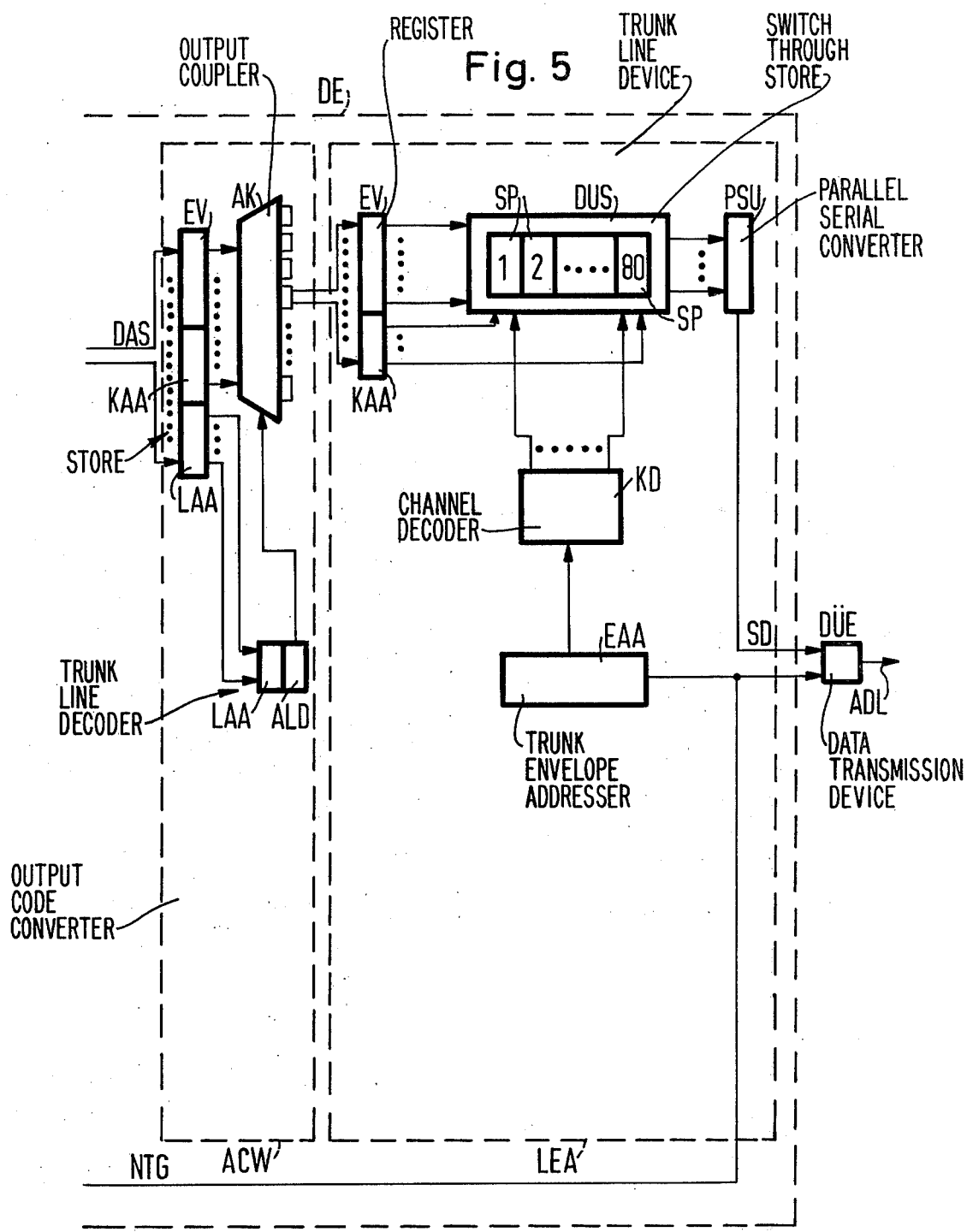

FIGS. 4 and 5 illustrate an advantageous exemplary embodiment of a switching arrangement by which the method in accordance with the invention can be practiced.

FIGS. 4 and 5 show, for improved clarity, an elongated view of a switching arrangement in which the feeder-side and trunk-side devices are shown separately. In the case of an installed switching system, the data lines must naturally be understood to be both feeder lines and trunk lines, so that each data line is preceded and followed by feeder-side and also trunk-side devices.

In the arrangement shown in FIGS. 4 and 5, each feeder data line ZDL is followed by a feeder line device LEZ, and each trunk line ADL is preceded by a trunk line device LEA. These devices assigned to the feeder and trunk lines are connected to one another by centralized input code converters ECW and output code converters ACW and by a switch-through flow control unit DAS. These components are each of known construction.

The switching of bit groups between feeders and trunks, in FIGS. 4 and 5 from the left to the right, now takes place in the following manner. Each data line ZDL, ADL is connected by a data transmission device DÜE to the switching system. In the data transmission device the incoming data are regenerated and matched to the physical conditions of the following switching system. This is effected similarly as in the case of outgoing data traffic, i.e., the transmitted data are matched to the physical conditions of the data line. Thus, the switching system receives the received data ED from a data transmission device. As the connected data line has been assumed to be one line of a pulsed data network in which the data are analyzed only in association with a central network pulse train, this central network pulse train NTG is made available by the switching system both to the data transmission device and to the devices individually assigned to the lines within the switching system.

By means of the network pulse train, the 3 pulse trains required in the present case are generated; these are the bit pulse train, the bit group pulse train (envelope pulse train) and the t.d.m. frame pulse train. As in all pulsed data networks, the bit pulse train is required to identify the individual bits as such. The bit group, or envelope, pulse train is required to synchronize all the data lines connected to the data switching system to the envelope format at the receiving end. This is necessary to ensure that all the envelopes to be processed by the switching system in one time slot are available in a time slot corresponding to an envelope length. Consequently, the possibility exists of connecting as many data lines ZDL, ADL to the switching system as envelopes can be processed by the switching system during the time slot of an envelope. Finally, the frame pulse train is also required in order to be able to establish the position of an envelope within a t.d.m. frame.

Accordingly, in the switching system, at the receiving end, initially envelope synchronization is effected between all the connected data lines ZDL by means of a synchronizing circuit SY. Commencing from the synchronizing circuit SY, in each line device LEZ connected to the output of a feeder line, the received envelope is written into a serial-parallel converter SPU. In addition, commencing from the synchronizing circuit SY, in a manner which has not been represented, an envelope address counter EAZ is, with the aid of the frame and the envelope pulse train, in each case brought to the state assumed by the currently received envelope within the t.d.m. frame.

The envelope which has thus been converted by the serial-parallel converter SPU into a parallel bit group, and which in each case consists of the status bit and, for example, the 8 data bits, is coupled into an evaluation circuit EB. This evaluation circuit EB contains various bit configurations Ml to Mn with which the received envelope is compared. Various types of comparison circuits which form the evaluation circuit EB for comparing various bit configurations with the received envelope are known in the art. Thus, in actual fact with the aid of a sample it is established which status is possessed by the received envelope, i.e., whether this envelope relates to a signalling characteristic for connection establishment or to an information characteristic which is to be switched through or to a resting channel. If the envelope contains a signalling characteristic or an information characteristic which is to be switched through, then a switching request is directed from the relevant sample via a channel coder KC and a conventional trigger circuit A to an input code converter ECW. If, however, the received envelope relates to a resting channel, i.e., neither information characteristic nor signalling characteristics are being transmitted via this channel, then no switching request is emitted.

With the aid of another sample, the received envelope is in each case compared with the envelope received on the same channel in the preceding t.d.m. frame. If the information content of the envelope has changed, a switching request is likewise directed to the input code converter ECW via the trigger circuit A. If, however, the contents of the envelope have not changed, this request is not made.

The channel coder KC is not only connected to the envelope evaluation unit EB, but is also connected to the envelope feeder addressing circuit EAZ. Whereas in the envelope feeder addressing circuit the envelopes of a frame, for example, as represented in FIGS. 2 and 3, are counted through from 1 to 80, the channel coder KG is permanently set to the channels of the data line ZDL. That is, on the input of a plurality of envelope addresses belonging to one channel, as shown, e.g., in FIG. 3, the channel coder KC in each case forms only one feeder channel address KAZ assigned to this channel. This feeder channel address KAZ is coupled, in association with the related envelope EV, into a store connected subsequently the envelope evaluation unit and the channel coder KC.

On the basis of the switching trigger sent by the request circuit A, which for example can be in the form of a simple trigger stage, to the input code converter ECW, in an identifier ID it is established from which line device LEZ, and thus from which data line ZDL, a switching request has been sent to the switching system. An identifier ID of this type operates in accordance with the hunting chain principle as described, for example, in German Auslegeschrift No. 1 287 600 and in the corresponding British Pat. No. 1,164,954. On the evaluation of this switching request by the identifier ID, an input coupler EK, connected subsequently to the envelope feeder channel address store EV, KAZ, is fed with the command to input the envelope and the feeder channel address KAZ into an envelope and feeder channel address store EV, KAZ within the input code converter ECW. Here, a multiplexer of normal construction can be used as input coupler EK.

In addition, on the basis of the switching request, by a non-illustrated coding circuit, the identifier ID forms the feeder line address LAZ which, again in association with the envelope and the feeder channel address, is input into a storage position LAZ within the input code converter ECW.

Either the identifier ID and the input coupler EK are connected, not only to the illustrated feeder line device LEZ of the data line ZDL, but also to all the other feeder line devices of the lines connected to the switching system, or else in each case only one group of feeder line devices is connected to an input code converter ECW, in which case a plurality of input code converters are provided.

If the envelope EV has been written into the store assigned to the input code converter ECW in association with the feeder channel address LAZ, then this entire bit group is offered to a switch-through flow control unit DAS which corresponds in terms of functioning to a transmission flow control unit described in the German OS No. 1 946 389 and in the corresponding U.S. Pat. No. 3,717,723. If, as described above, a plurality of input code converters are provided, these then are connected to the switch-through flow control unit independently of one another. Furthermore, the switch-through flow control unit DAS, as shown in FIG. 1, is connected to the central storage unit SE of the electronic data switching system. Finally, the switch-through unit DE also contains a connection store DVS which is likewise connected to the switch-through flow control unit DAS.

In the connection store DVS, each feeder channel is permanently assigned a feeder cell. If the switch-through flow control unit DAS is offered by the input code converter ECW an envelope in association with the feeder channel and the feeder line address, then on the establishment of the connection, on the basis of the signalling characteristic contained in the envelope, in the same way as described in the German OS No. 1 946 389 and in the corresponding U.S. Pat. No. 3,717,723, the desired connection is established via the storage unit SE and via the program control unit PE in that the address of the required trunk is entered into the feeder cell permanently assigned to the feeder in the connection store DVS. When the connection is established, via the switch-through flow control unit DAS, only that feeder cell characterized by the feeder channel—and feeder line address is operated, and via a store cycle, the trunk address stored in the feeder cell is added to the envelope received by the switch-through flow control unit. Thus in the existence of a connection, and on the reception of an envelope EV, the switch-through flow control unit DAS effects an interchange of addresses of feeder address and trunk address. At the output end, in respect of the switch-through flow control unit DAS, thus the envelope EV received by the switch-through flow control unit DAS is entered, unchanged, but in association with the trunk address (trunk channel address KAA and trunk line address LAA) into a store of an output code converter ACW.

This output code converter ACW, similarly as the input code converter, is either arranged centrally for all the trunk lines or is in each case provided for a group of trunk lines, and in the latter case an output code converter ACW is provided for each group of data lines. Within the output code converter ACW, are arranged in each case one output coupler AK and one trunk line decoder ALD. The output coupler AK, which can consist of a demultiplexer of known construction, is connected by its input to the envelope and the trunk channel address store EV, KAA and at its output is connected to the associated trunk line devices LEA. Thus via the output coupler AK, the envelope EV and the trunk channel address KAA are each made available to the trunk line device LEA which is designated by the trunk line address LAA. To this end the trunk line decoder ALD is connected to the output coupler AK, so that the trunk line decoder ALD within the output coupler AK in each case releases the path to the desired trunk line device LEA for the envelope EV stored in the output code converter ACW and trunk channel address KAA. Within the trunk line device LEA, the envelope EV and the trunk channel address KAA are initially stored in a register. Subsequently, the envelope is entered into a switch-through store DUS comprising a full t.d.m. frame, at the point designated by the trunk channel address KAA. The switch-through store DUS is an addressable store. On the input of a bit group, the trunk channel address KAA is employed as address of the switch-through store DUS.

The read-out of the switch-through store DUS is particularly simple when each bit group of a t.d.m. frame is assigned a data channel thus e.g. a data line having a frame of 80 bit groups for the transmission of 80 data channels.

In the trunk envelope addresser EAA, which is connected to the central network pulse train generator NTG, in practice only the envelope pulse train is formed and from this pulse train, with the aid of a counter which has a cycle of 1 to 80, the trunk envelope address EAA is formed. If a t.d.m. frame contains as many envelopes as channels exist on a line, it is possible to dispense with the channel decoder KD. In this case the envelopes can in fact be read out from the switch-through store DUS simply by addressing the individual storage positions SP by the trunk envelope addresser, as the latter selects the storage positions SP in turn. From the particular selected storage position SP, the envelope entered therein is entered into a parallel-serial converter PSU from where it is transferred as transmitted data SD to the data transmission device DÜE of the trunk line ADL.

If, however, data lines comprising channels of differing transmission speeds, such as illustrated in FIG. 3 for example, are connected to the switching system, a plurality of envelopes within the t.d.m. frame, namely those which belong to a higher speed channel, possess the same channel address KAA. Accordingly, if for example, as shown in FIG. 3, the envelope E1, E21, E41 and E61 belong to a trunk channel, the channel address of the trunk KAA is identical to the first storage position SP in the switch-through store DUS. These 4 envelopes are thus consecutively written into the first storage position SP of the switch-through store DUS. In order to nevertheless bring the envelopes into the correct position within the t.d.m. frame in this case for transmission on the trunk line ADL, the channel decoder KD is provided. The latter ensures that in the example shown in FIG. 3, the storage positions SP from 1 to 20 are consecutively addressed within the switch-through store DUS, and that instead of the consecutive addressing of the storage position 21, the storage position 1 is again addressed. Then the storage positions 22 to 40 are again consecutively addressed and subsequently, instead of the storage position 41, the storage position 1 is again addressed. This ensures a correct classification of the envelopes within a t.d.m. frame even with channels exhibiting differing speeds, at the trunk end.

Channel coder KC and channel decoder KD can be in the form of gate networks or as addressable stores. If stores are used, the number supplied by the envelope addressers EAZ and EAA is employed as address, and thus a cell is read out which contains the associated channel address KAZ or KAA.

However, the channel coder KC (or KD) can also be constructed together with the envelope addresser EAZ (or EAA) as programmable counter.

The description given hereinabove is of a preferred form of execution of the method of the invention. The apparatus which is described for carrying out the method is to be considered only as being exemplary, and any form of apparatus capable of performing the steps of the method defined in the following claims can be used. Further, the specific operations for carrying out the method of the invention can be modified or changed while remaining within the scope of the invention, as defined by the appended claims.

We claim:

1. A method for program controlled switching of data transmitted in bit groups and interleaved within a time division multiplex (TDM) frame, wherein the bit group position within the TDM frame corresponds to a channel assignment, comprising the steps of:
   communicating a request signal to a data switching system upon reception of bit groups to be switched through,
   comparing received bit groups with predetermined bit configurations,
   producing a comparison result signal having a first value if identical bit configurations are received in successive cycles in a channel, the comparison result signal of the first value being communicated to the data switching system,
   forming a feeder channel address and a feeder line address for each bit group from that bit group's position within the TDM frame,
   storing the feeder channel address and the feeder line address in a register means,
   selecting a feeder cell in a connection store on the basis of the feeder channel and line addresses, the selected feeder cell being permanently assigned to each feeder.
   entering the feeder channel and line addresses for each bit group in its respective feeder cell in response to signalling characteristics contained in the bit groups,
   reading out from said feeder cell the trunk line and channel addresses forming the trunk address of a desired trunk for a switching through connection, said feeder cell being read with each succeeding bit group,
   selecting a trunk corresponding to the read-out trunk line address,
   coupling each bit group and corresponding trunk channel address to a trunk line identified by the corresponding trunk line address,
   writing the bit groups into a switch-through store prior to transmission so a TDM frame can be seized at a point determined by the corresponding trunk channel address,
   reading the bit group from said switch-through store as frequently as it is received and,
   transmitting the contents of said switch-through store for all channels when said writing step is completed.

2. The method defined in claim 1 comprising the additional steps of:
   producing a comparison request signal having a second value if a bit group conforms to a bit configuration corresponding to a message signal or a signalling character,
   producing a comparison request signal of a third value if the bit group conforms to a bit configuration for an idle channel, and
   communicating the request signal to said data switching system only if the comparison request signal is of the first or second value.

* * * * *